3,564,452
LASER WITH STABLE RESONATOR
Robert C. Rempel, Los Altos, Calif., assignor to Spectra-Physics, Inc., Mountain View, Calif., a corporation of California
Filed Aug. 23, 1965, Ser. No. 481,655
Int. Cl. H01s 3/02, 3/08, 3/22
U.S. Cl. 331—94.5                           6 Claims

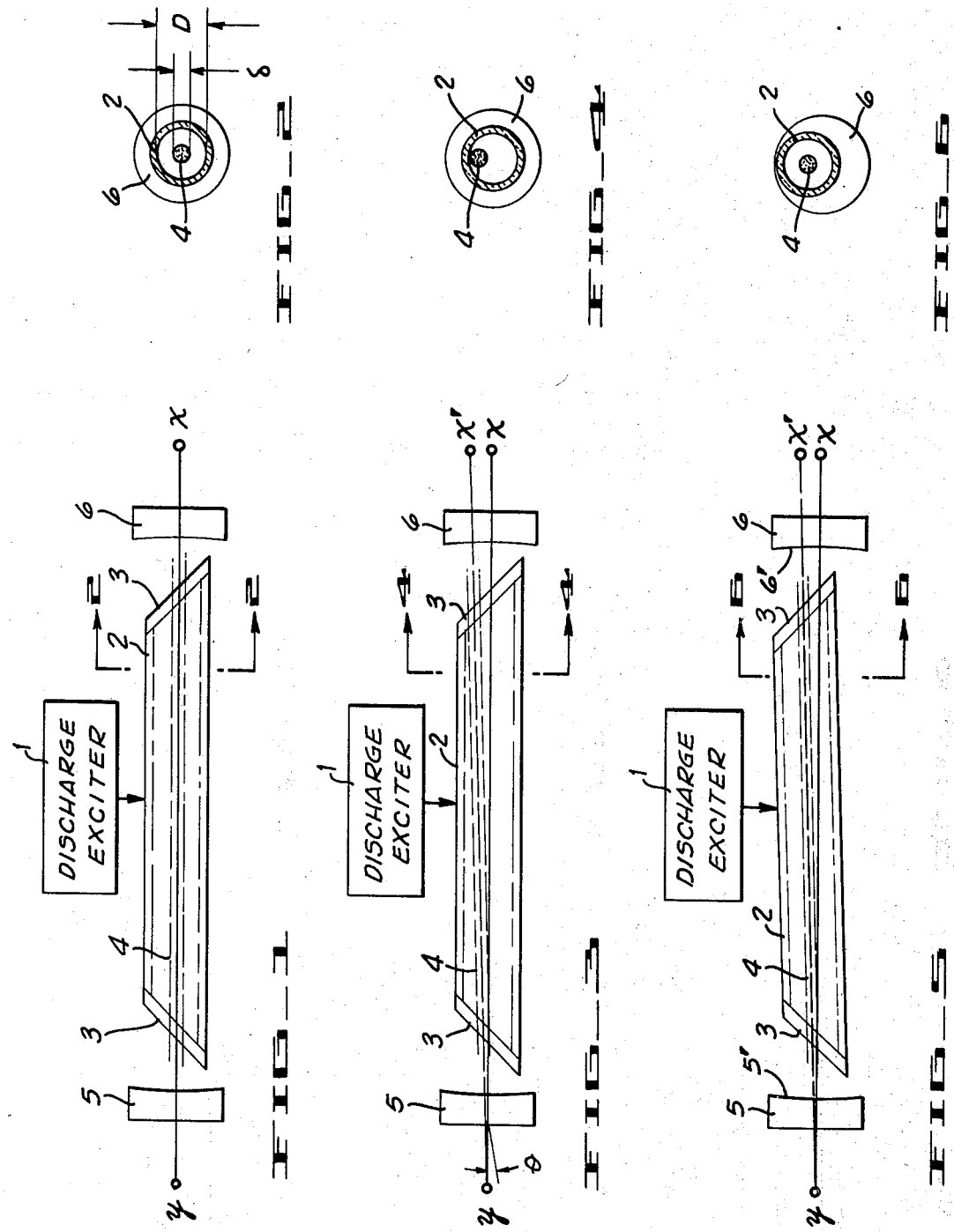

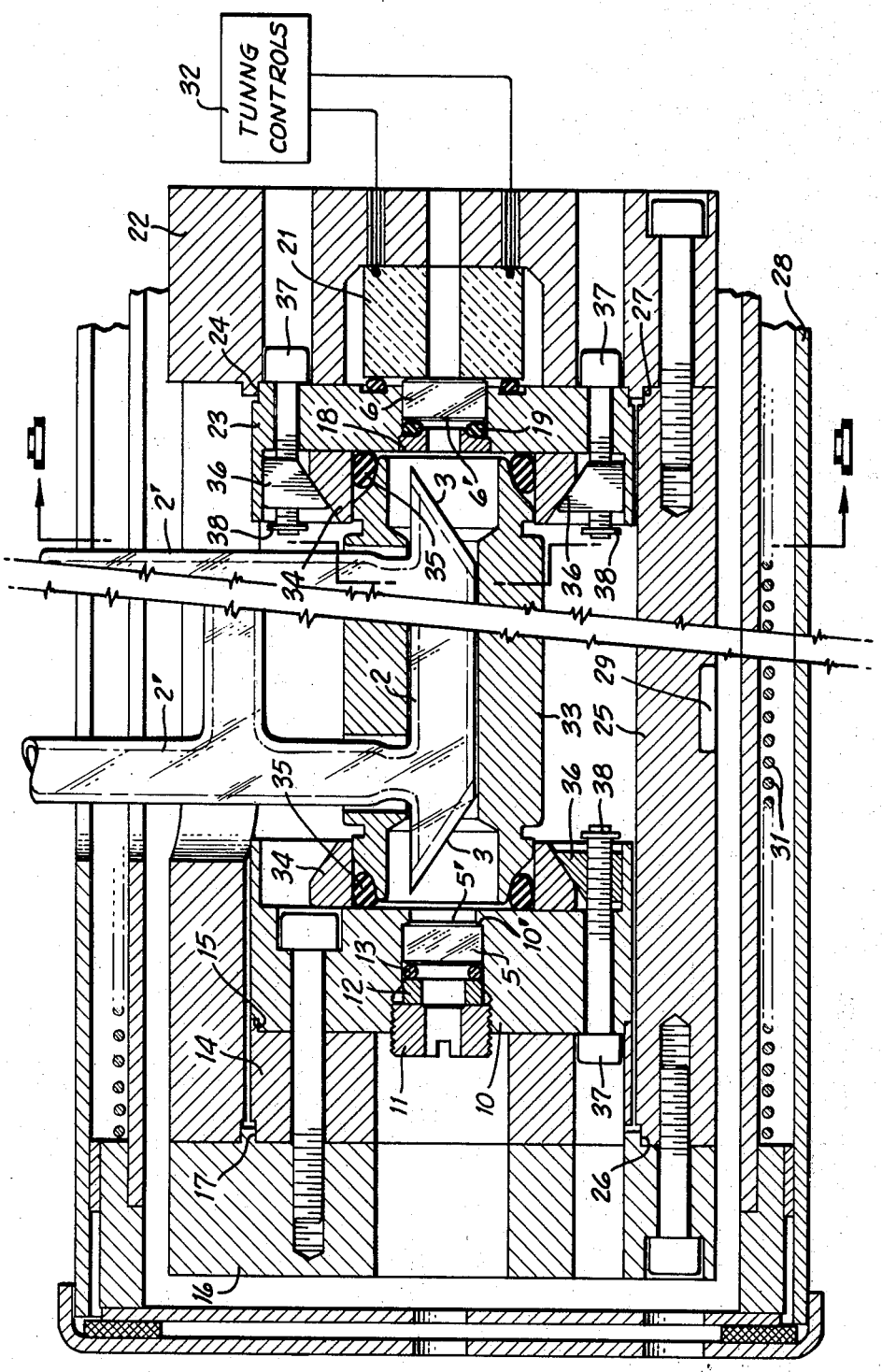

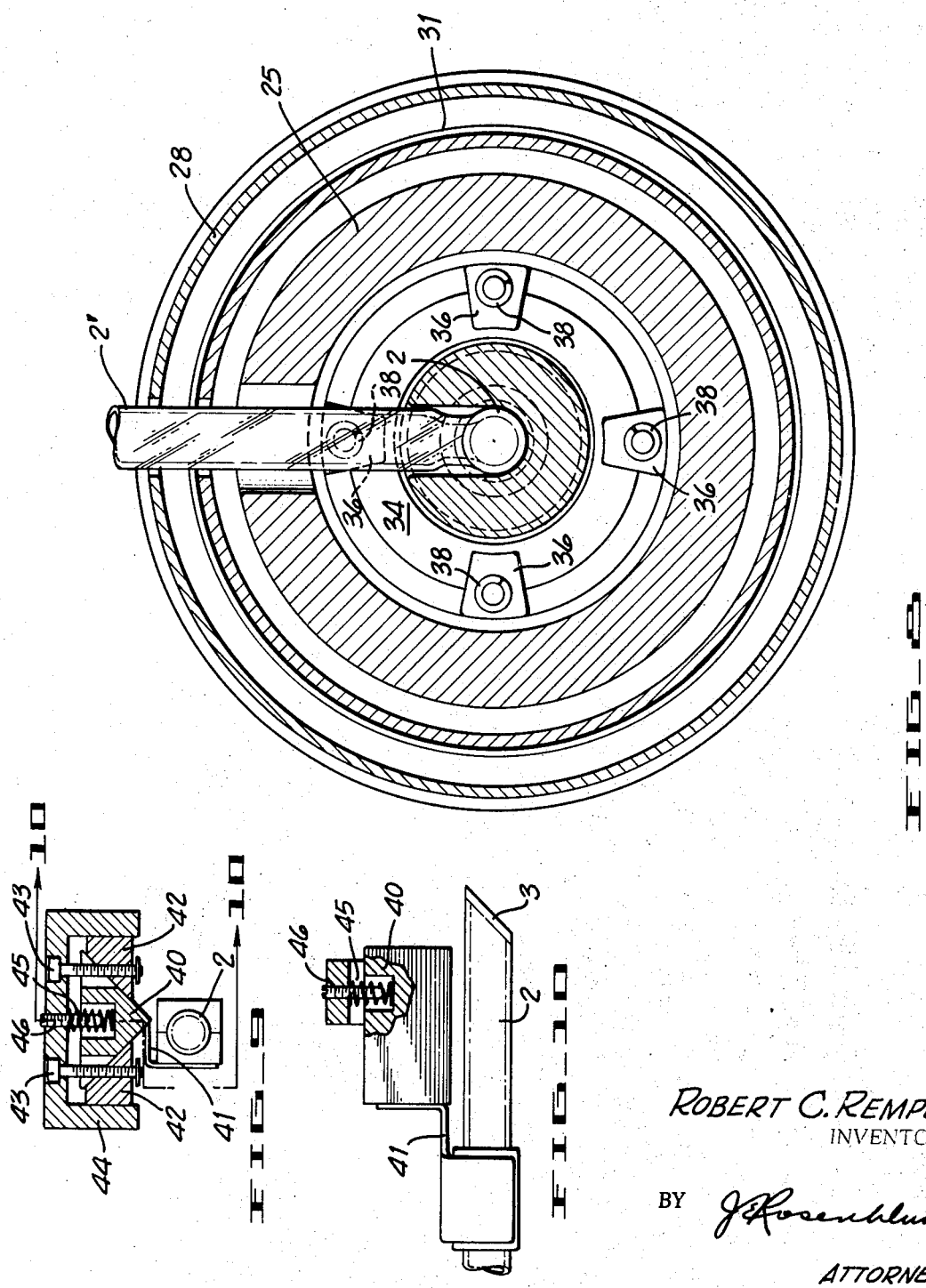

ABSTRACT OF THE DISCLOSURE

A gas laser in which the resonator reflectors are supported by an essentially non-adjustable structure in a position which establishes a fixed axis for the propagation of radiation in the resonator. Means are provided for independently adjusting the position of two length-wise spaced-apart portions of the plasma tube so that the axis of the plasma tube can be aligned with the resonator axis to within a distance which is less than the mode diameter of the resonator radiation.

---

The present invention relates in general to lasers, and more particularly to an arrangement for permitting optimum alignment of a laser having a stable optical resonator.

The two basic components of a laser are an active medium in which optical radiation is generated and amplified and an optical resonator which constrains the radiation in a desired electromagnetic mode. Often it is necessary to provide an apertured structure which limits the cross-sectional area of the resonator radiation, for example to introduce sufficient diffraction loss for cutting off undesired high order spatial modes. In the case of a gas laser, this limiting aperture is usually provided by the plasma tube which contains the gaseous active medium. A plasma tube of limited cross-section also often has the further advantage of increasing the gain of the active medium. Under such circumstances, it is important that the propagation axis of the resonator be accurately centered relative to the limiting aperature so as to minimize the effects of diffraction loss with respect to the desired radiation.

Heretofore, the reflecting elements of which the optical resonator is comprised have been mounted on supports which can be angularly adjusted to give the desired alignment of the resonator axis. Such an arrangement is found to have significant disadvantages, particularly since the alignment is extremely sensitive to changes in the angular position of the mirrors and very delicate high-resolution angle adjustment mechanisms are required. Thus, for example, the amounts are subject to mechanical and acoustical vibrations which can cause amplitude and frequency instabilities in the laser output. Moreover, the resonator may go out of adjustment due to wearing of the parts or severe temperature changes, necessitating a difficult and time-consuming re-alignment.

It is the object of the present invention to provide a laser in which the precise alignment of the resonator radiation with respect to the limiting aperture can be made without the above-described disadvantages. Generally speaking, this is accomplished by making the resonator members stable and essentially non-adjustable and providing suitable means for precisely adjusting the position of the limiting aperture to coincide with the propagaton axis of the resonator.

The various features and advantages of the present invention will become more apparent upon a consideration of the following specification, taken in connection with the accompanying drawing wherein:

FIGS. 1, 3 and 5 are simplified elevational views of gas lasers with various orientations between the plasma tube and reflectors to illustrate the basic principles of the present invention;

FIGS. 2, 4 and 6 are cross-sectional views taken along lines 2—2, 4—4 and 6—6 in FIGS. 1, 3 and 5, respectively;

FIG. 7 is a longitudinal cross-sectional view of a laser in accordance with the present invention;

FIG. 8 is a transverse cross-sectional view taken along line 8—8 in FIG. 7;

FIG. 9 is a transverse cross-sectional view of an alternative form of plasma tube adjustment mechanism in accordance with the present invention; and FIG. 10 is a longitudinal view taken along line 10—10 in FIG. 9.

FIGS. 1 and 2 show a typical gas laser in which an optically-radiating discharge is established by power source 1 in the active gaseous medium contained in plasma tube 2. Optical radiation at the desired wavelength is transmitted through vacuum-tight windows 3, inclined at Brewster's angle for maximum transmission, and propagated back and forth through the amplifying active medium in a beam pattern 4 by an optical resonator comprising a pair of optically-facing reflectors 5 and 6. Sufficient transmission at the operating wavelength is provided in at least one of the reflectors to permit the formation of an extrnal laser beam. In order to minimize the sensivity of the optical resonator to misalignment in the parrellelism of the reflectors and to provide better control over the resonator modes, it is the usual practice to use at least one curved reflector.

For the lowest order spatial mode of the optical resonator, the intensity of the resonator beam 4 across a transverse section such as shown in FIG. 2 falls off radially according to the relationship $I=I_o e^{-8r^2/\delta^2}$, where $r$ is the radial distance from the tube axis, and $\delta$, which is twice the radial distance at which the intensity has dropped to $1/e^2$ of its central intensity $I_o$, is defined as the beam diameter. For a resonator operating at wavelength $\lambda$ with spherical reflector 5 of radius (of curvature) $R_1$ and spherical reflector 6 of radius $R_2(R_2 \leq R_1)$, the variation of the beam diameter $\delta$ with the distance $z$ from reflector 5 is given by:

$$\delta = \delta_o \sqrt{1 + \frac{4\lambda(z_o - z)^2}{\pi \delta_o^2}}$$

where $$\delta_o = \frac{\delta_2}{\sqrt{1 + \left(\frac{\pi \delta_2^2}{4\lambda R_1}\right)^2}}$$

is the minimum beam diameter which occurs at $z = z_o$, $$z_o = \frac{R_1}{1 + \left(\frac{4\lambda R_1}{\pi \delta_2^2}\right)^2}$$

and $$\delta_2 = \sqrt{\frac{4\lambda}{\pi}} \left[\frac{R_2}{R_1} \cdot \frac{R_1 - L}{R_2 - L} \cdot \frac{R_1 R_2 L}{R_1 + R_2 - L}\right]^{1/4}$$

is the maximum beam diameter which occurs at $z = L$, where L is the distance between the reflectors.

In order to operate in the lowest order spatial mode, the bore diameter D of the plasma tube 2 is usually chosen to be somewhat larger than $\delta_2$ so as to expose a large percentage of the beam power to the amplifying medium, but not so large as to permit oscillation of higher order modes (which have a larger beam size). It is not usually necessary to make D greater than $2\delta$, since at this point 99.97% of the beam power is contained in the plasma tube. Moreover, increasing the bore size may lead to an undesirable decrease in the gain of a gaseous medium.

Operation in the lowest order spatial mode is usually the most desirable, since this produces a single-phase diffraction limited output wavefront. Operation in a higher order mode may be used for somewhat greater power with phase reversals in the output wavefront. For operation in a higher order mode, the plasma tube diameter D is made larger relative to $\delta_2$ for the lowest order mode. In general, the plasma tube will be somewhat larger than the maximum beam diameter for the operating mode, and the beam diameter will vary along the tube in accordance with the equations given above.

The above discussion assumes that the propagation axis of the resonator is perfectly coincident with the axis of the plasma tube. In this case, the diffraction loss produced by the plasma tube aperture D is given approximately by $e^{-4D/\delta}$. For the typical value of $D=2\delta$, the loss is then approximately 0.0004. Any deviation of the resonator axis from the plasma tube axis will cause the tube aperture to intercept the radiation at a smaller effective value of D and thus increase the diffraction loss. Considering that the losses at the windows 3 and reflectors 5 and 6 are typically of the order of 0.0010, an interception of the beam by the tube aperture at a distance of $\delta/4$ or less from the beam diameter, corresponding to a displacement of the resonator axis from the tube axis by an amount of $\delta/4$ or more, will introduce enough diffraction loss that the gain and output of the laser will be significantly decreased. Accordingly a means for adjusting the alignment of these axes to a resolution finer than this typical value on the order of $\delta/4$ must be provided. In a curved reflector resonator, the propagation axis is defined by a line joining the centers of curvature of the reflectors. If the reflectors are perfectly aligned as in FIG. 1, the center $x$ of reflector 5 and the center $y$ of reflector 6 both lie on the tube axis. Now consider a situation, illustrated by FIGS. 3 and 4, in which the reflector 5 is angularly misaligned by an amount $\theta$ so that its center of curvature is displaced to point $x'$ whereby the propagation axis $x'-y$ no longer coincides with the axis of the plasma tube. In general, the angle $\theta$ through which reflector 5 must rotate in order to cause a displacement of the resonator axis by an amount equal to $\delta/4$ is the smaller of the following two expressions:

$$\theta = \frac{\delta_1}{4} \frac{(R_1+R_2-L)}{R_1(R_2-L)}$$

or $$\theta = \frac{\delta_2}{4} \frac{(R_1+R_2-L)}{R_1 R_2}$$

where $\delta_1$ is the value of $\delta$ at $z=0$.

The same pair of equations hold for rotation of the reflector 6, except that the subscripts 1 and 2 are inverted.

In a typical laser with $L=1$ meter or less, $R_2=L$, and $R_1=\infty$ or $L$, the smallest value for $\theta$ is one minute of arc or less. For a typical reflector mount of three centimeters in diameter, an angular misadjustment of one minute of arc corresponds to a misadjustment of an adjusting screw in said mount of only one-hundredth of a millimeter. An adjusting mechanism having a resolution considerably finer than this maximum permissible misalignment is required, thus indicating the reason that it is difficult to maintain stable alignment of adjustable reflectors.

My invention is based on the recognition that even if the resonator is slightly misaligned, the laser can be made to operate advantageously by a simple, lower-resolution adjustment in the position of the plasma tube or other limiting aperture. With reference to FIG. 3, for example, this would be accomplished by adjusting the position of the plasma tube 2 so that the tube axis coincides with the propagation axis $x'-y$ as shown in FIGS. 5 and 6. It is only required that the optical axis (defined by the centers of the reflectors) lie on a line which intercepts the reflecting surfaces 5' and 6'. For the same typical laser ($L=1$ meter or less, $R_2=L$, $R_1=\infty$ or $L$) a misadjustment in the transverse position of the plasma tube by as much as one-half of a millimeter can be tolerated before the beam is displaced from the tube axis by the corresponding amount $\delta/4$. For other resonator configurations, for example one in which both $R_1$ and $R_2$ are large compared to L, the angle $\theta$ which can be tolerated for angular misalignment of a reflector adjustment is even smaller; yet the plasma tube adjustment, which depends only on the selection of a suitable value of plasma tube diameter D relative to the mode diameter $\delta$, would be no more sensitive than in the previous example.

Thus it can be seen the aperture adjustment in accordance with the present invention permits the use of a simpler, less sensitive, adjustment mechanism. Moreover, there is less instability in the laser output since vibrations of parts inside the resonator do not result in substantial fluctuations in either amplitude or frequency.

The constructional details of a laser in accordance with the present invention are shown in FIGS. 7 and 8.

The reflector 5 is held against a ridge 10' in mounting plate 10 by means of a holding nut 11 which bears against spacer 12 and rubber O-ring 13. The mounting plate 10 fits into a spacer plate 14 via lap joint 15; and spacer plate 14, in turn, fits into end plate 16 via lap joint 17. Reflector 6 is held by holding nut 18 and O-ring 19 against the inner end of a piezoelectric cylinder 21 which bears against a recessed surface in end plate 22, and is retained in a mounting plate 23 which fits into end plate 22 via lap joint 24. The resonator end plates 16 and 22 are held in spaced-apart relationship by a cylindrical housing 25 which is fitted thereto at the lap joints 26 and 27. Typically the separation between reflectors 5 and 6 is ten centimeters and the diameter of each reflector is 7.75 millimeters. With this small spacing between reflectors, the axial modes are sufficiently spaced in frequency relative to the Doppler emission line of a helium-neon laser at 6328 A. that oscillation occurs on only one such mode and a substantialy single frequency output is thereby obtained. By maintaining machining tolerances of ±0.0005 inch for the various fitted parts, the reflectors 5 and 6 are held in sufficient non-adjustable alignment that an optical axis is established between the reflecting surfaces 5' and 6'.

Whereas in this particular construction no means of adjustment are provided for the reflectors, it may be desirable to provide a coarse of shimming adjustment to facilitate factory assembly and also to relax the stringent requirements on the required machining tolerance. Such and adjustment need only have sufficient angular resolution to insure that a propagation axis is established between the reflecting surfaces of the reflectors. In practice, this resolution will be substantially more coarse than that required to minimize the diffraction losses of the aperture, and thus rugged structures can be used which do not significantly degrade the stability of the resonator mounts.

The end plates 16 and 22, the mounting plate 10, and the housing 25 are all made of a low temperature coefficient material such as invar in order to minimize temperature-dependent changes in the separation between reflectors. Space plate 14 and mounting plate 23 are made of a higher temperature coefficient material such as stainless steel in order to provide bimetallic compensation for any residual changes in length with temperature; for example, as the end plates 16 and 22 move apart with rising temperature and tend to urge the reflectors apart, the increased expansion of members 14 and 23 tend to urge the reflectors together by a compensating amount. To provide temperature control, the housing 25 is supported in an oven 28 and the temperature is sensed by thermistor 29 and imbedded in housing 25 to activate a control circuit (not shown) which regulates the current in heater coil 31 to maintain constant temperature. Small changes in the spacing of the reflectors, and hence laser oscillation frequency, are made by applying a variable voltage to piezoelectric element 21 from external tuning controls 32.

Thus, there is provided a rigid and stable resonator which results in a high degree of amplitude and frequency stability for the laser output.

The plasma tube 2 is supported in a stiffening block 33 and the ends of block 33 are inserted in a beveled ring 34. Rubber O-rings 35 are pressed between block 33 and rings 34 and, together with the reflector O-rings 13 and 19, form a hermetic seal for the intra-resonator space, thus avoiding circulation of air which could contaminate the optical surfaces and also cause undesired fluctuations in index of refraction. The tubular extensions 2' of the plasma tube lead to suitable discharge electrodes and a discharge power supply (not shown).

Adjustment of the plasma tube to coincide with the optical axis is effected by means of four wedge blocks 36 spaced in quadrature about each of the beveled rings 34. Screws 37, typically having forty threads to the inch, are threaded through the blocks 36 and terminated by snap rings 38. Rotation of the screws 37 cause the blocks 36 to travel therealong whereby the inclined surfaces of said blocks may be adjusted to any desired guiding position for engaging the inclined beveled surface of the plasma tube rings 34. Horizontal transverse motion of the plasma tube is effected by loosening one and then tightening the other of the horizontally-aligned pair of screws 37, and vertical transverse motion of the plasma tube is effected by loosening one and then tightening the other of the vertically-ailgned pair of screws 37. In this manner substantially orthogonal adjustments may be made to align the plasma tube axis with the resonator axis with sufficient resolution for maximizing the laser power. This mechanism, involving firm sliding engagement of parts, is advantageously rugged and simple to fabricate.

FIGS. 9 and 10 show an alternate plasma tube adjusting mechanism, also using a rugged structure with parts held in sliding engagement. A wedge block 40 is attached to the plasma tube 2 by a bracket 41. The member 40 has inclined surfaces disposed at right angles. The wedge guiding blocks 42 have inclined, perpendicularly-disposed, guiding surfaces which are positionally adjusted by screws 43 threaded through channel member 44 which is fixedly attached in any desired manner to the housing of the laser. Spring 45 urges the inclined surfaces of the plasma tube wedge 40 in firm sliding engagement with the inclined surfaces of guiding wedges 42. Adjustment of each screw 43 thus provides a substanially orthogonal transverse positioning adjustment for the plasma tube which is then secured by setscrew 46. A similar structure is provided at each end of the plasma tube.

I claim:

1. In a gas laser, the combination comprising: an optical resonator comprising a plurality of reflectors; means for supporting said reflectors in a fixed nonadjustable position which establishes a fixed axis for the propagation of radiation in said resonator; an elongated container structure for an active gaseous laser medium, said container structure being positioned within said optical resonator and forming a limiting aperture for said resonator radiation; and means independently adjusting the position of two lengthwise spaced-apart portions of said container structure for precisely aligning said limiting aperture with respect to said fixed propagation axis.

2. The combination of claim 1 wherein the resolution of said adjusting means is sufficient to position the center of said aperture to within a distance of said fixed propagation axis which is less than the mode diameter of the resonator radiation.

3. The combination of claim 1 wherein said adjusting means includes: a beveled ring attached to said container structure in surrounding relation therewith at one of said spaced-apart container structure portions; and a plurality of wedge blocks spaced in quadrature about the periphery of said ring, said blocks each having an inclined surface conforming to the inclined surface of said beveled ring; and means adjusting the position of said block for engaging the inclined surfaces of said blocks with the inclined surface of said beveled ring in sliding relation to thereby adjust the position of said container structure portion.

4. The combination of claim 1 wherein said adjusting mechanism includes: a wedge block having a pair of inclined surfaces intersecting substantially at right angles, said block being attached to said container structure at one of said spaced-apart container structure portions; a pair of guiding blocks, one member of each pair having an inclined surface conforming to one of the inclined surfaces of said wedge block; means adjusting the position of said guiding blocks; and means for urging the inclined surfaces of said wedge block to engage the inclined surfaces of said guiding blocks in sliding relation to thereby adjust the position of said container structure portion.

5. A method of aligning a laser, said laser having an optical resonator comprising a plurality of reflectors and means forming a limiting aperture interposed between said reflectors, which method comprises the steps of: rigidly orienting said reflectors to establish a fixed nonadjustable axis for the propagation of radiation in said resonator; and precisely adjusting the position of said limiting aperture into alignment with said fixed propagation axis.

6. The method of claim 5 wherein said adjustment is made to a resolution sufficient to position the center of said aperture to within a distance of said fixed propagation axis which is less than the mode diameter of the resonator radiation.

References Cited

UNITED STATES PATENTS

| | | | |
|---|---|---|---|
| 3,229,224 | 1/1966 | Waly et al. | 331—94.5 |
| 3,242,439 | 3/1966 | Rigden et al. | 331—94.5 |
| 3,247,467 | 4/1966 | Geusic et al. | 331—94.5 |
| 3,395,606 | 8/1968 | Neill | 331—94.5X |

OTHER REFERENCES

Ealing, "Optical Benches," Applied Optics, vol. 2, No. 12, December 1963, p. A19.

Large et al., "A Compact Pulsed Gas Laser for the Far Infrared," Applied Optics, vol. 4, No. 5, pp. 625–626, May 1965.

RONALD L. WIBERT, Primary Examiner

R. J. WEBSTER, Assistant Examiner

U.S. Cl. X.R.

356—153